3,503,752
PROCESS FOR ENRICHING MILK WITH PROTEINS

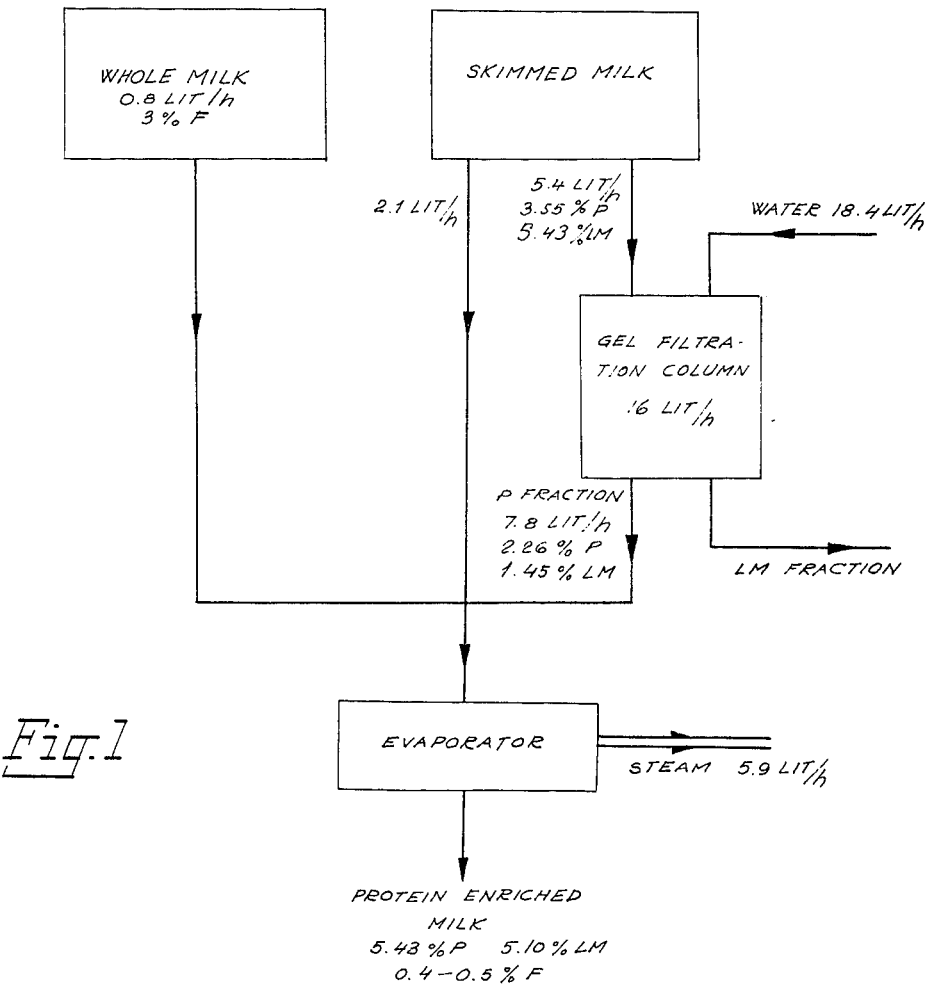

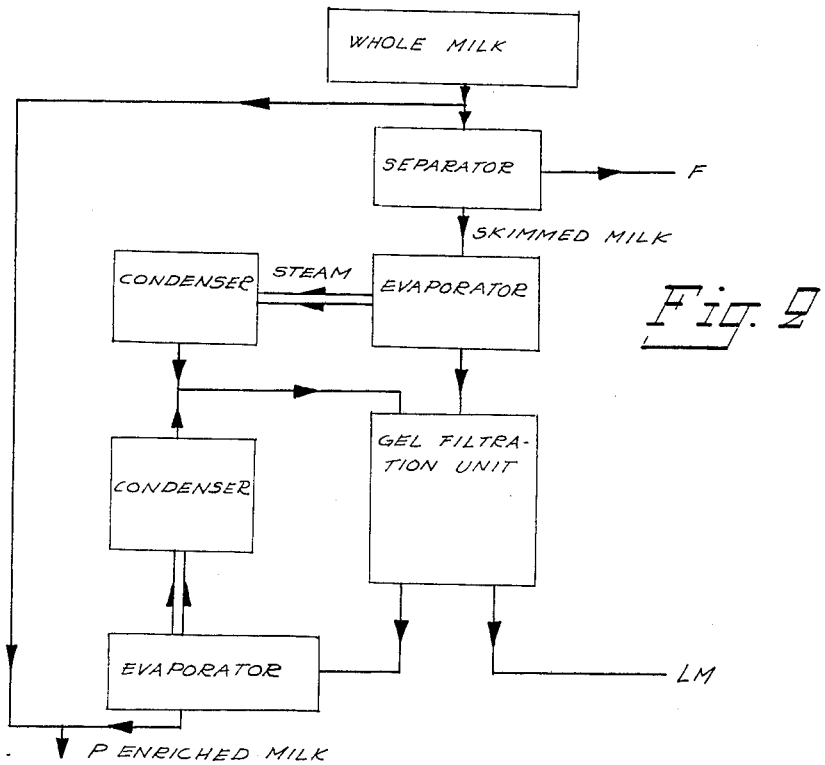
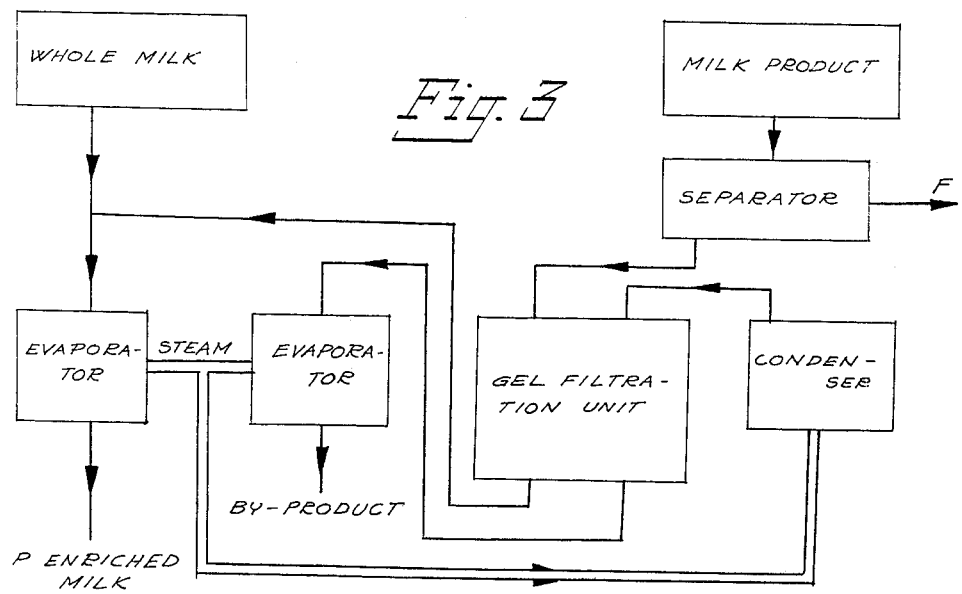

Nils I. Arne Emneus, Uppsala, and Arne O. Sten, Bergsbrunna, Sweden, assignors to Pharmacia Fine Chemicals AB, Uppsala, Sweden, a company of Sweden
Filed June 20, 1967, Ser. No. 647,519
Claims priority, application Sweden, June 22, 1966, 8,590/66
Int. Cl. A23c 9/14
U.S. Cl. 99—54                                    16 Claims

ABSTRACT OF THE DISCLOSURE

A process for enriching milk with proteins comprises dividing skimmed milk, i.e. milk wholly or substantially free of fat, or partially evaporated skimmed milk, by gel filtration, into a first fraction containing proteins and 10–90 percent, by weight, of the low molecular weight substances of the skimmed milk such as sugars and salts, and a second essentially protein-free fraction containing the balance of the low molecular weight substances; mixing the protein containing fraction with whole milk and/or with skimmed milk and wherein this fraction prior to the mixing operation and/or the mixture obtained after this operation is subjected to an evaporation process.

---

The present invention is concerned with a process for enriching milk with proteins, i.e. to increase the protein content of milk.

The invention is characterized in that skimmed milk, i.e. milk wholly or substantially free of fat, or partially evaporated skimmed milk is divided, by gel filtration, into firstly a fraction containing proteins and 10–90, preferably 20–60 percent, by weight, of the low molecular weight substances of the skimmed milk such as sugars and salts, and secondly an essentially protein-free fraction containing the balance of the low molecular weight substances; whereupon the protein containing fraction is mixed with whole milk and/or with skimmed milk, this fraction prior to the mixing operation and/or the mixture obtained after this operation being subjected to an evaporation process.

Gel filtration is nowadays a commonly applied technique for separating purposes. It is based on the principle that, by means of gel grains which may, for instance, contain a copolymer of a hydroxyl group-containing substance such as dextran with a bifunctional substance such as epichlorohydrin (Sephadex®) or a copolymer of an alkylidene-bis-acrylamide with an ethylenically unsaturated substance, a separation is carried out between the different ingredients from a solution thereof into at least two fractions according to molecular sizes, owing to the varying ability of the substances to penetrate into the interior of the gel grains.

A gel filtration process is carried out in two working steps. In the first of these steps the solution of the substances which are to be separated from each other or to be divided into fractions is introduced into a bed of the gel grains. In the second working step liquid is supplied to the bed for the purpose of causing elution to take place.

Various embodiments of the above described process are conceivable.

According to one embodiment of the invention, the protein fraction obtained in the gel filtration of skimmed milk can be subjected to evaporation.

According to a second embodiment of the invention, the amount of the steam obtained in the evaporation process or processes can be so adjusted that the water obtained subsequent to condensation is sufficient for the elution step of the gel filtration.

According to a third embodiment of the invention, the water obtained subsequent to condensation can be collected and transported to the gel filtration process in a closed system. Hereby great advantages are obtained. In the treatment of food stuffs it is, of course, an essential requirement that the product should not be contaminated with bacteria or other foreign substances. This requirement is complied within an extraordinarily excellent manner by the present invention.

If partially evaporated skimmed milk is subjected to gel filtration according to what is set forth above, it can be evaporated to a volume of at least about 35 percent of the original volume.

The simplest manner in which to obtain a protein enriched milk would, of course, be to evaporate milk. At the same time as the content of protein increases in the product, the content of low molecular substances such as sugars and salts would, however, also increase. Hereby the product would obtain a considerably impaired flavour which is ascribed to the increased content of salt. The protein enriched milk obtained according to the invention has surprisingly been found to maintain the excellent flavour qualities of the starting milk.

Gel filtration of skimmed milk is previously known (P. J. de Koning: Verslagen van het Nederlands Instituut voor Zuivelonderzoeck (NIZO) EDE, No. 75, "Gel Filtration, A New Method Applied for the Preparation of Lactose-Free Milk," September 1962). In this connection, the purpose of the gel filtration process is to free skimmed milk from low molecular weight ingredients, primarily lactose. No mention, however, is made in the article to the effect that a protein enriched milk is prepared.

The gel grains used for gel filtration of skimmed milk according to the invention should preferably present a water regain in the range of from 1 to 5 g. per g. of dry substance.

If the gel filtration is carried out continuously in a bed of gel grains with periodical repetition of the working cycle charging-elution, this gel filtration can, according to a special embodiment of the invention, be interrupted when the flow resistance in the bed has reached a relatively high value and an aqueous solution of alkali metal hydroxide such as sodium hydroxide be passed through the bed at a temperature of at least 50° C.

The reason for the flow resistance increasing in the gel bed is not fully understood, but there is reason to assume that it is the question of precipitations which prevent the flow of liquid in the bed.

Gel grains, the dry substance of which is a copolymer of an hydroxyl group-containing substance such as dextran with a bifunctional substance such as epichlorohydrin, has proved excellently suitable to use in that embodiment of the invention in which the gel filtration process is interrupted by a treatment with alkalihydroxide solution. Due to the stability of the ether bridges, these copolymers excellently endure the influence of the alkaline reacting substance in the concentration necessary for the removal of clogs and precipitations.

Surprisingly it has proved that the described effect of the alkalihydroxide solution depends upon the treatment taking place at elevated temperatures. If the treatment is carried out at low temperatures, it has, of course, proved necessary, in order to cause the alkaline solution to flow into the bed in an appropriate way, to open the gel filtration column and install an expansion vessel on the latter, permitting the bed to expand into this vessel. The bed must then be repacked in order to rehabilitate it into an operatable condition. This type of treatment would therefore be very troublesome and time-consuming and would, particularly in the use of columns of large sizes, result in increased process costs. The treatment with alkalihydroxide solution according to the invention makes possible an effective regeneration of the bed, without the dimensions of the latter being essentially changed.

The aqueous solution of alkalihydroxide used for the treatment according to the invention may, for example, have a concentration in the range of from 0.5 to 3%.

The treatment can, for instance, be carried out at a temperature in the range of from 55 to 75° C.

In the accompanying drawings, FIG. 1 shows a flow sheet of a process, which is described in detail in Example 1;

FIG. 2 shows a flow sheet of a process, which is described in detail in Example 2; and FIG. 3 shows a flow sheet of a process, which is described in detail in Example 3.

The invention will now be described in detail with reference to the following working examples. In the flow sheets the syllables P, LM and F are abbreviations for, respectively, "protein," "low molecular weight substances" (sugars, primarily lactose and salts) and "fat."

EXAMPLE 1

In a gel filtration column having an inner diameter of 20 cm. was packed a bed of gel grains containing a copolymer of dextran with epichlorohydrin, said gel having a water regain of 2.5 g. per g. (Sephadex G–25 coarse from Pharmacia Fine Chemicals AB, Uppsala, Sweden). The bed volume was 16 litres. With reference to FIG. 1 there were charged 5.4 litres of skimmed milk containing 3.55 percent of protein and 5.43 percent of low molecular weight substances at a rate of 0.8 litre per minute into the gel filtration column and eluted with 18.4 litres of water at the rate of 1.6 litres per minute. A protein fraction having the volume of 7.8 litres, containing 2.26 percent of protein and 1.45 percent of low molecular weight substances was taken out from the eluate liquid. The amount of remaining low molecular weight substances in the protein fraction was thus 39 percent. The protein fraction was mixed with 2.1 litres of skimmed milk and 0.8 litre of whole milk having a fat content of about 3 percent, after which 5.9 litres of water were driven off from the mixture in an evaporator. In this connection 4.8 litres of a milk, containing 5.43 percent of protein: 5.10 percent of low molecular weight substances and 0.4 to 0.5 percent of fat, were obtained, said product presenting excellent flavour properties.

The process was carried out at a temperature of 5–10° C.

EXAMPLE 2

Referring to the flow sheet of FIG. 2, milk, containing fat, was introduced into a conventional type separator in order to remove the fat. The fat-free milk was passed to a first evaporator, whereafter the steam driven off was condensed and the evaporated milk passed to a gel filtration unit. The water obtained during the condensing process was passed to the gel filtration unit as a first part of the eluent. The milk was divided in the gel filtration unit into two fractions, namely a fraction containing proteins and a fraction containing low molecular weight substances. The protein fraction was passed into a second evaporator wherein it was evaporated and then mixed with the whole milk. The obtained milk was a milk enriched with protein and was fit for immediate consumption. The steam driven off during the evaporation process was condensed, whereafter the obtained condensate was passed to the gel filtration unit as a second part of the eluent.

The obtained protein-enriched milk could be adjusted to the same high protein content as in Example 1, without impairing the flavour.

EXAMPLE 3

Referring to the flow sheet of FIG. 3, a milk product was introduced into a separator for the removal of fat, whereafter the obtained fat-free milk was passed to a gel filtration unit. The product was divided up in the latter into two fractions, namely a fraction containing proteins and a fraction containing low molecular weight substances. The first mentioned fraction was mixed with whole milk, whereupon the mixture was passed to a first evaporator and evaporated. The steam was condensed and passed to the gel filtration unit as a part of the eluent. The fraction containing low molecular weight substances was passed to a second evaporator. The steam departing in said second evaporator was mixed with steam from the first evaporator and the condensate was used as a second part of the eluent. Milk with a high protein content was obtained from the first evaporator; the product being suitable for direct consumption and which had no troublesome secondary flavour.

EXAMPLE 4

A gel filtration column having an inner diameter of 25 mm. and a bed height of 966 mm., filled with gel grains of a copolymerisate of dextran with epichlorohydrin, having a water regain of 2.5 g. per g. (Sephadex G–25 coarse from Pharmacia Fine Chemicals, Uppsala, Sweden) was used for continuous gel filtration of skimmed milk with operation all round the clock. In the course of 21.5 hours there were carried out 43 gel filtration cycles while charging 122 ccm. of skimmed milk per cycle, totally 5240 ccm. of skimmed milk per period amounting to 21.5 hours. The charging period lasted 10 minutes, the total cycle time being 30 minutes. At the beginning of the operation period the pressure drop was 870 cm. of water column, but after 21.5 hours the latter had risen to 1370 cm. of water column due to clogs in the gel bed. In order to rehabilitate the latter into its original condition, a wash treatment was carried out according to the following:

(1) Heating of the column by means of water of 80° C. circulating through the jacket of the latter for 0.25 hour.

(2) 1500 ml. of a 1-percent aqueous solution of sodium hydroxide were pumped through the gel bed without changing its dimensions. The temperature of the introduced liquid was 75° C. and that of discharged liquid 55° C. Time period: 0.75 hour.

(3) Washing away sodium hydroxide with distilled water. Time period: 1.5 hours.

After this treatment of the gel bed which thus lasted about 2.5 hours, the pressure drop through the bed was about the same as at the beginning of the operation period or 820 cm. of water column.

What we claim is:

1. The method for preparing protein enriched milk which comprises dividing a member selected from the group consisting of skimmed milk nnd partially evaporated skimmed milk by gel filtration into first a fraction containing proteins and 10–90 percent by weight of the low molecular weight substances of the skimmed milk and secondly an essentially protein-free fraction containing the balance of the low molecular weight substances, whereupon the protein containing fraction is mixed with a member selected from the group consisting of whole milk and skimmed milk, the protein-containing fraction, prior to the mixing operation being subjected to an evaporation process.

2. The method according to claim 1 wherein the first fraction obtained in the gel filtration process contains 20–60 percent by weight of the low molecular weight substances of the skimmed milk.

3. A method as claimed in claim 1 wherein the protein free fraction is subjected to evaporation.

4. A method as claimed in claim 1, wherein the steam obtained in the evaporation process after condensation is passed to the gel filtration process as eluent.

5. A method as claimed in claim 4, where the quantity of the steam obtained in the evaporation process is so adjusted that that the water obtained subsequent to condensation is sufficient for the elution step of the gel filtration process.

6. A method as claimed in claim 1, wherein the gel filtration process is carried out continuously in a bed of gel grains with periodic repetition of the working cycle charging-elution, characterized in that, when the flow resistance of the bed has reached a relatively high value, the gel filtration process is stopped and an aqueous solution of alkali hydroxide is passed through the bed at a temperature of at least about 50° C.

7. A method as claimed in claim 6, wherein treatment with an aqueous solution of alkali hydroxide is carried out at a temperature in the range of from 55 to 75° C.

8. A method as claimed in claim 6 wherein the concentration of alkali hydroxide in the aqueous solution is in the range of from 0.3 to 5 percent.

9. The method for preparing protein enriched milk which comprises dividing a member selected from the group consisting of skimmed milk and partially evaporated skimmed milk into firstly a fraction containing proteins and 10-90 percent by weight of the low molecular weight substances of the skimmed milk and secondly an essentially protein-free fraction containing the balance of the low molecular weight substances, whereupon the protein containing fraction is mixed with a member selected from the group consisting of whole milk and skimmed milk, the mixture obtained after this operation being subjected to an evaporation process.

10. The method according to claim 9, wherein the first fraction obtained in the gel filtration process contains 20-60 percent by weight of the low molecular weight substances of the skimmed milk.

11. A method as claimed in claim 9, wherein the protein free fraction is subjected to evaporation.

12. A method as claimed in claim 9, wherein the steam obtained in the evaporation process after condensation is passed to the gel filtration process as eluent.

13. A method as claimed in claim 12, wherein the quantity of the steam obtained in the evaporation process is so adjusted that the water obtained subsequent to condensation is sufficient for the elution step of the gel filtration process.

14. A method as claimed in claim 9, wherein the filtration process is carried out continuously in a bed of gel grains with periodic repetition of the working cycle charging-elution, characterized in that, when the flow resistance of the bed has reached a relatively high value, the gel filtration process is stopped and an aqueous solution of alkali hydroxide is passed through the bed at a temperature of at least about 50° C.

15. A method as claimed in claim 14, wherein the treatment with an aqueous solution of alkali hydroxide is carried out at a temperature in the range of from 55 to 75° C.

16. A method as claimed in claim 14, wherein the concentration of alkali hydroxide in the aqueous solution is in the range of from 0.3 to 5 percent.

References Cited

UNITED STATES PATENTS 2,682,467  6/1954  Brereton et al. _____ 99—54 X
3,074,796  1/1963  Peebles et al. _____ 99—55

OTHER REFERENCES

Koning, P. J., Gel Filtration, A New Method Applied for the Preparation of Lactose-Free Milk, Neth. Milk & Dairy, J. 16 (1962), July 1962 (pp. 210-215).

LIONEL M. SHAPIRO, Primary Examiner

D. M. NAFF, Assistant Examiner

U.S. Cl. X.R.

99—20, 55, 60